United States Patent Office 3,682,860
Patented Aug. 8, 1972

3,682,860
THERMALLY STABLE POLYMERS AND METHOD OF THEIR PRODUCTION
Naoya Yoda, Takashi Kubota, Masaru Kurihara, and Noriaki Dokoshi, Otsu, and Toshiya Yoshi-i, Kyoto, Japan, assignors to Toray Industries, Inc., Tokyo, Japan
No Drawing. Filed Feb. 26, 1970, Ser. No. 14,685
Claims priority, application Japan, Mar. 3, 1969, 44/15,391; Sept. 3, 1969, 44/69,363; Sept. 22, 1969, 44/74,605
Int. Cl. C08g 20/32
U.S. Cl. 260—47 CB 7 Claims

ABSTRACT OF THE DISCLOSURE

Heat resistant polyamideimides with an amide bond to imide bond ratio of 2:1.

FIELD OF THE INVENTION

The present invention relates to heat resistant polymers of the so-called polyamideimide series having as repeating units amide bonds and imide bonds and to a method for the production thereof.

DESCRIPTION OF THE PRIOR ART

Heretofore, with reference to the production of polyamideimide, the following prior art has been known. In U.S. Pat. 3,260,691, a polyamideimide, wherein an imide ring and an amide group exist alternately in a ratio of 1:1, obtained by reaction of tricarboxylic monoanhydride or a halide thereof with diamine, is described. In Japanese patent application publication No. 8,910/1965 and Japanese patent application No. 19,302/1966, polyamideimide, wherein an imide ring and an amide group exist alternatively, obtained by reaction of tricarboxylic anhydride with diisocyanate, is described. On the other hand, in U.S. Pat. 3,355,427, polyamideimide, obtained by the reaction of a diamine and a tetracarboxylic acid having 2 amide bonds in its molecule is described. In this polyamideimide, 2 imide rings and 2 amide bonds exist alternately and as a whole, imide rings and amide bonds are present in the ratio of 1:1. However, these polyimideamides fail to have sufficiently satisfactory physical properties with respect to processability for molding, flexural resistance and abrasion resistance.

As a result of our study with a view to improving these deficiencies and producing high quality heat resistant polymers of the polyamideimide series, we have succeeded in developing polyamideimide in which the amide bonds and the imide rings exist in the ratio of 2:1. These polymers are not only excellent in heat resistance but also excellent in electric properties and mechanical properties and especially excellent in abrasion resistance. Further, these polyamideimides are useful as films, fibers, enamel and other coatings, molded articles, laminates and foams.

SUMMARY AND DETAILED DESCRIPTION OF THE INVENTION

The present invention relates to polyamideimide of excellent thermal resistance represented by the general Formula I and a method of its production.

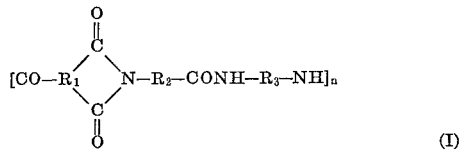

wherein $R_1$ is a $C_3$–$C_{15}$ trivalent organic group having 3 carbonyl groups bonded respectively to different carbon atoms two of which are adjacent; $R_2$ is a $C_2$–$C_{15}$ divalent organic group having an amino group and a carboxyl group bonded to respectively different carbon atoms that are preferably nonadjacent; and $R_3$ is a $C_2$–$C_{15}$ divalent organic group having 2 isocyanate groups bonded to different and preferably nonadjacent carbon atoms, and $n$ is a number from 5 to 10,000.

The polyamideimide of the present invention is easily produced by reacting an imidedicarboxylic acid (II),

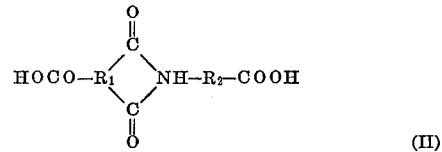

an amide tricarboxylic acid (II') or monoester thereof (II')

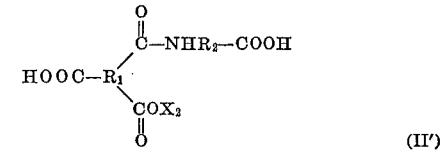

or iminolactone dicarboxylic acid (VII)

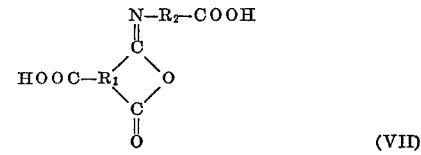

(wherein $R_1$ and $R_2$ are as defined above and $X_2$ may be an aryl, alkyl or alicyclic group), with a diisocyanate (III) represented by the general formula $$OCN—R_3—NCO$$

(wherein $R_3$ is as defined above) or a derivative thereof.

In the imidedicarboxylic acid (II) used in the present invention $R_1$ is ordinarily an aliphatic group, an alicyclic group or an aromatic group. However, an aromatic group is preferred. Such preferred groups include

wherein Z may be a carbon-carbon bond, an alkylene group

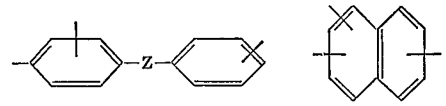

The imidedicarboxylic acid used herein is not particularly limited as to method of its production. However, it is convenient to produce it by reacting a tricarboxylic acid anhydride, represented by the general formula

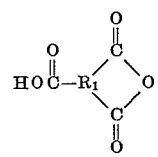

with an equimolar amount of aminocarboxylic acid, represented by the general formula $NH_2$—$R_2$—$COOH$, to obtain (II).

Examples of tricarboxylic acids which may be used to produce an imidedicarboxylic acid by this method include, trimellitic anhydride,
2,3,6-naphthalenetricarboxylic anhydride, 2,3,5-naphthalenetricarboxylic anhydride,
2,2',3-biphenyltricarboxylic anhydride,
2-(3,4-dicarboxyphenyl)-2-(3-carboxyphenyl)propane anhydride,
1,2,4-naphthalenetricarboxylic anhydride,
1,4,5-naphthalenetricarboxylic anhydride,
2,3,5-pyrazinetricarboxylic anhydride,
2-(2,3-dicarboxyphenyl)-2-(3-carboxyphenyl)propane anhydride,
1-(2,3-dicarboxyphenyl)-1-(3-carboxyphenyl) ethane anhydride,
1-(3,4-dicarboxyphenyl)-1-(4-carboxyphenyl) ethane anhydride,
(2,3-dicarboxyphenyl) (2-carboxyphenyl)methane anhydride,
1,2,3-benzenetricarboxylic anhydride,
and 3,3',4-tricarboxybenzophenone anhydride.

Examples of aminocarboxylic acids which may be used include

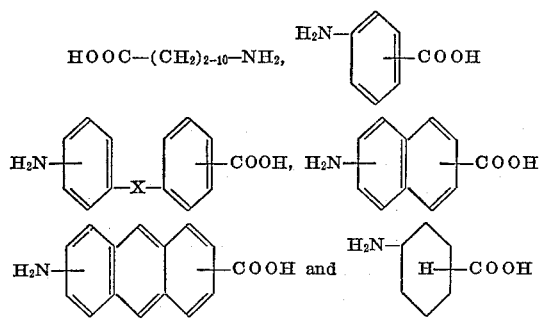

wherein

X may be any moiety capable of directly bonding aromatic nuclei such as a carbon-carbon bond, an alkylene group,

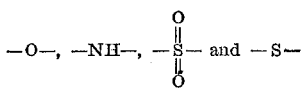

The imidedicarboxylic acid reaction, like the polymerization reaction to be described later, is preferably carried out in an organic solvent. If the reaction temperature is not relatively high, the imidedicarboxylic acid is not obtained. With a reaction temperature of about 50–300° C., the reaction proceeds as follows.

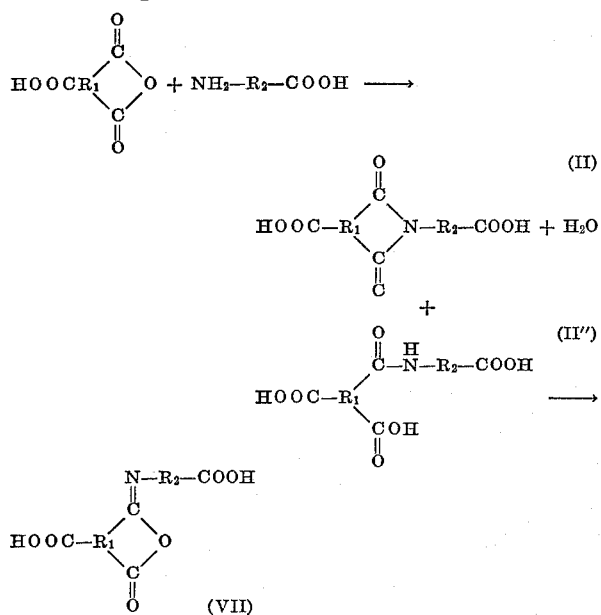

The latter product (VII) is imino lactone dicarboxylic acid. When the foregoing reaction is carried out at a relatively low temperature, −50 to 150° C., products II″ and VII can be prepared depending on reaction conditions. Amide tricarboxylic acid monester (II′) can be obtained by alcoholysis of imino lactone dicarboxylic acid VII. The procedure for the preparation of VII and II′ will be described in more detail later. The production ratio of (II) to (II″), wherein $X_2=H$, varies depending upon the reaction temperature and time, i.e. by making the reaction temperature relatively low, it is possible to obtain (II″) and by making the reaction temperature relatively high, it is possible to obtain (II). Also, it is possible to produce (II″) at first and then convert it to (II) by heat-dehydration, thus closing the imide ring. The reaction conditions required for complete production of (II), for example, may be 130° C. for 3 hrs., 150° C. for 2 hrs. or 190° C. for 30 minutes.

When the imidedicarboxylic acid produced by this method is reacted with a diisocyanate to produce the polyamideimides of the present invention, any by-product (II″) which may be present increases the solubility of the polymer. However, such a polymer may thereafter be converted to a high molecular weight polymer, and the degree of polymerization thereof increased, by after-treatment. The compounds (II), (II′) and (VII) can be used for the following polymerization reactions as a single monomer or as comonomer components of either two or three of these compounds.

It goes without saying that the so obtained (II) can be isolated. However, by selecting in the first place a solvent suitable for the polymerization reaction to be mentioned later, it is also possible to subject the reaction mixture per se to the polymerization.

In the diisocyanate reactant (III) used to produce the polyamideimide of the present invention, $R_3$ may be an aliphatic, alicyclic or aromatic group. An aromatic group is preferred.

As such diisocyanates, there are:

tetramethylene-(1,4)-diisocyanate,
hexamethylene-(1,6)-diisocyanate,
cyclohexane-(1,4)-diisocyanate,
dicyclohexylmethane-(4,4')-diisocyanate,
toluylene-(2,6)-diisocyanate,
toluylene-(2,4)-diisocyanate, and a mixture thereof,
diphenylmethane-(4,4')-diisocyanate,
diphenylether-(4,4')-diisocyanate,
naphthylene-(1,5)-diisocyanate,
hexahydrodiphenyl-4,4'-diisocyanate,
triphenylmethane-4,4',4-diisocyanate,
1-methoxy benzene,
2,4-diisocyanate,
azobenzene-4,4'-diisocyanate,
diphenylsulfone-4,4'-diisocyanate,
, '-dipropyletherdiisocyanate,
diphenylsulfide-2,4-diisocyanate and
anthraquinone-2,6-diisocyanate.

Diisocyanate derivatives which can be used as one component in the polymerization reaction of the present invention include derivatives produced by reacting diisocyanate with alcohol (ROH) at a molar ratio in the range 1:1 or 1:2 (wherein R is a hydrocarbon group having 1 to 12 carbon atoms.

Such derivatives react with carboxyl groups in a way to produce the same products as are produced by the diisocyanates per se. More specifically, the diisocyanate derivative which may be used include an aliphatic diamine derivative such as N,N'-diethoxycarbonyl hexamethylene diamine, N,N'-diphenoxycarbonyl trimethylene diamine and N,N'-dicyclohexyloxycarbonyl decamethylene diamine, an aromatic diamine derivative such as N,N'-dimethoxycarbonyl benzidine, N,N'-dimethoxycarbonyl diaminodiphenylsulfone, N,N' - dimethoxycarbonyl-4,4'-diaminodiphenylmethane and N,N'-diethoxycarbonyl-1,5-diaminonaphthalene, an alicyclic diamine derivative such as N,N'-diethoxycarbonyl-1,4-cyclohexyl diamine and N,N'-diphenoxycarbonylcyclopentane - 1,3 - diamine and the following additional compounds:

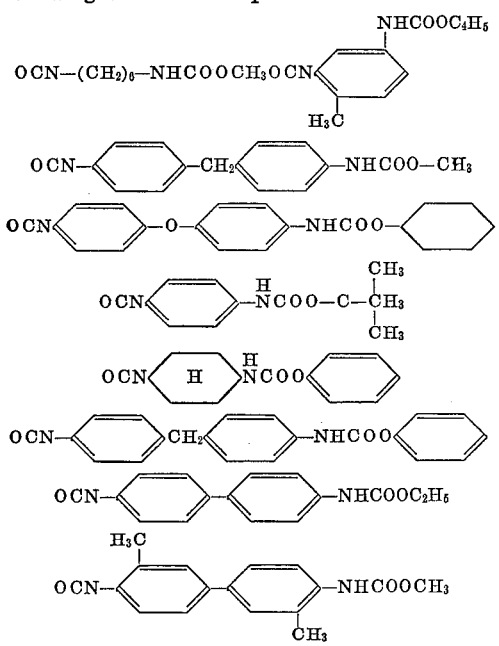

The above mentioned method of producing the polyamideimide (I) of the present invention may be expressed as follows:

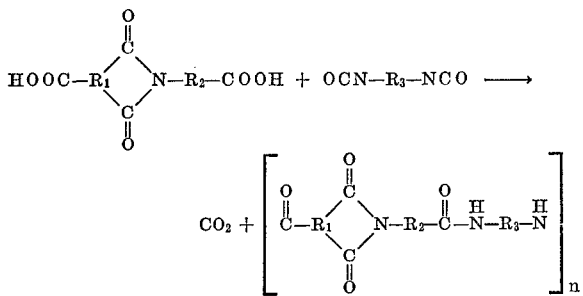

or if a derivative of diisocyanate is used,

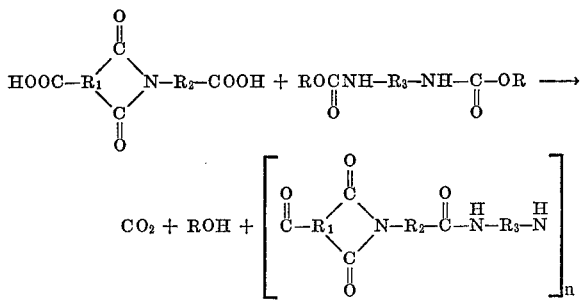

Preferably this reaction is carried out in an organic solvent.

Preferred for this purpose are solvents such as a N,N-dialkyl amide, e.g., dimethyl acetamide or diethyl acetamide, N-methyl-2-pyrrolidone, N-methyl-caprolactam, dimethyl formamide and diethyl formamide. However, tetramethyl urea, pyridine, dimethyl sulfone, hexamethylphosphoramide, tetramethylene sulfone, formamide, N-methyl formamide, butylolactone, N-acetyl-2-pyrrolidone, trimethyl phosphate and triethyl phosphite may also be used. Further, these solvents may be used alone or in admixture, and they may include additions, such as benzene, toluene, nitrobenzene, dioxane, cyclohexanone, and tricylene is completely permissible.

Generally, the polymerization reactants are added in equimolar amounts. However, copolymerization components may also be included. This will be discussed in more detail later.

The polymerization reaction temperature may be anywhere in the range from room temperature to 300° C. However, when diisocyanate derivatives are used a relatively high polymerization temperature, 130° C. to 350° C., is required. It is especially preferred in such a reaction to carry out the reaction in two stages. Namely, after the polyamide is initially produced, it is shaped and the shaped article is further heated. The heating temperature in this case is about the same as the temperature used in ring closing treatment, namely 50° C.–40° C. Again, in this case, alcohol and carbon dioxide are given off and must be removed from the system.

At the time of the polymerization reaction, in order to increase the solubility of the polymerization reaction product and keep uniform the reaction system, it is possible to add inorganic salts and organic tertiary amines. As such inorganic salts, lithium chloride, calcium chloride, magnesium carbonate and zinc chloride are useful.

Various substances functioning as catalysts or accelerators to the reaction may also be added. As such substances, a tertiary amine such as, for example, pyridine, γ-picoline, quinorine, triethyl amine, trimethyl amine and N,N-dimethyl amine as well as N-substituted morpholine such as, for example, N-methyl morpholine and N-ethyl morpholine, are useful.

Metal salts of weak acids such as, cobalt acetate and cobalt naphthenate and alkali metal salts such as, sodium oleate, have remarkable catalytic activities.

The polymerization reaction of the present invention, as mentioned above, may be carried out in the presence of various kinds of copolymerization components.

Because such components can impart other characteristics while maintaining the basic excellent physical properties of the polyamideimide (I) of the present invention, copolymerization is very useful and of great practical significance.

Dehydration or ring closing of the resultant polyamide and/or ester may be effected by ordinary dehydration methods, namely treating the polyamide at a temperature sufficient to cause the dehydration reaction or treating the polyamide with a dehydrating agent such as carboxylic anhydride. The temperature of the former dehydration treatment, by heating is normally at least 50° C. and preferably in the range 200–400° C. And the reaction system at this time is preferably in a non-oxidizing state such as under a reduced pressure or in an inert gas atmosphere. As a dehydrating agent used in the latter chemical treatment, a carboxylic anhydride, such as acetic anhydride, propionic anhydride and benzoic anhydride is preferably used. However, when they are used in the presence of a basic substance such as pyridine and quinorine their effectiveness is enhanced.

That the polymers thus produced are polyamideimides has been confirmed by measuring the infrared spectrum (at 5.64 microns and 5.89 microns the characteristic absorption of an imide bond was observed and at 6.02 microns the characteristic absorption of an amide bond was observed) and by elementary analysis.

By the use of amidetricarboxylic acid as a copolymerization monomer in the polyamideimide reaction of the present invention a varnish of improved processability is produced. This varnish by aftertreatment can be converted to a final polymer substantially the same as the polyamideimide of the present invention in structure and physical properties.

Further, in the present invention, it is possible to use concurrently at least one monomer selected from the group consisting of dicarboxylic acids, tricarboxylic anhydrides and tetracarboxylic anhydrides as comonomer with imidedicarboxylic acid (II). Such dicarboxylic acids include dicarboxylic acids other than the starting material (II), for example, oxalic acid, malonic acid, succinic acid, glutaric acid, adipic acid, pimelic acid, suberic acid, azelaic acid, sebacic acid, terephthalic acid, isophthalic acid, hexahydroterephthalic acid, cyclohexylenediarboxylic acid, difumanylether, 4,4'-dicarboxylic acid or an esterified product thereof. Tri- and tetra-carboxylic anhydrides such as are mentioned above by general formula may also be used. A typical tricarboxylic anhydride is that represented by the general formula

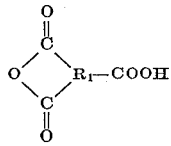

Such a tricarboxylic anhydride has been previously cited as a material for synthesizing imidedicarboxylic acid (II) and as specific examples those which have been listed with respect to that synthesis are preferred.

Tetracarboxylic dianhydride may be represented by the general formula

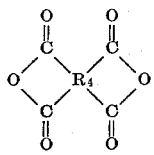

wherein $R_4$ is an organic group having at least 4 carbon atoms. $R_4$ may be an aromatic group, an aliphatic group, an alicyclic group, a heterocyclic group or a group consisting of combinations thereof, of which those having at least 6 carbon atoms are preferred. The 4 carbonyl groups in these dianhydrides must be bonded to different carbon atoms and each pair of carbonyl groups must be bonded to adjacent carbon atoms so that a cyclic anhydride may be formed. Ordinarily, $R_4$ is benzene, biphenyl, a condensation cyclic compound having 2-3 benzene rings or a 5- or 6-membered aromatic heterocyclic ring containing hetero atoms of sulfur, nitrogen or oxygen.

Included among these tetracarboxylic dianhydrides are pyromellitic dianhydride, 2,3,6,7 - naphthalenetetracarboxylic dianhydride, 3,3',4,4'-biphenyltetracarboxylic dianhydride, 4,4' - isopropylidynediphthalic dianhydride, naphthalene-1,4,5,8-tetracarboxylic dianhydride, pyrazine-2,3,5,6-tetracarboxylic dianhydride, 3,3'-isopropylidynediphthalic dianhydride, 3,3'-ethylidyne diphthalic dianhydride, 4,4'-ethylidynediphthalic dianhydride, 3,3'-methylenediphthalic dianhydride, benzene 1,2,3,4-tetracarboxylic dianhydride and 4,4'-carbonyldiphthalic dianhydride.

These copolymerization reactions proceed as follows:

(1) 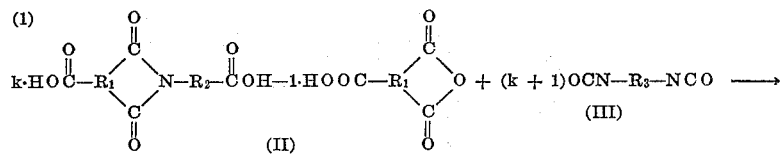

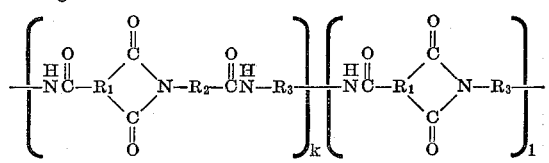

(2) 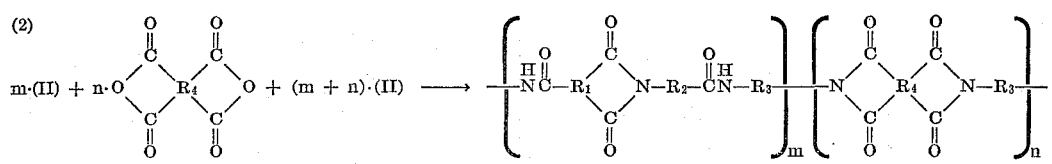

In the reactions of (1) and (2), $k$, $l$, $m$ and $n$ show the volume relation among each component used in the reactions by equivalent numbers and in each reaction the sum of the two acid components is preferably in an equimolar relation with diisocyanate.

Five to ninety mole percent, relative to the acid components of dicarboxylic acid, tricarboxylic anhydride or tetracarboxylic dianhydride may be used. However, preferably it is in the range 15-80 mole percent.

Copolymerization with tricarboxylic anhydride or tetracarboxylic dianhydride improves the heat resistance and electric insulating property of the polyamideimide of the present invention and the resultant copolymer still has excellent processability. In the case of copolymers including tetracarboxylic dianhydride, the electric insulating property is especially good.

Concerning the reaction conditions for the polymerization reaction in the presence of these copolymerization monomers, it is unnecessary to particularly change them from those used in the aforesaid homopolymerization. The polymerization temperature, the solvent and various additives such as polymerization accelerators may be properly selected within the aforesaid ranges.

As copolymerization monomers which can be substituted for imidedicarboxylic acid, besides the aforesaid compounds, certain other monomers can be used. For example, one such monomer is diimidedicarboxylic acid (N) obtained by reaction of tetracarboxylic dianhydride with aminocarboxylic acid

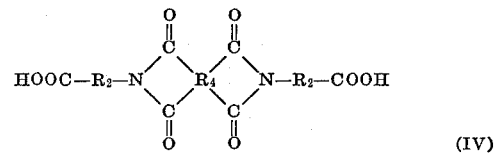

(wherein $R_2$ and $R_4$ are as defined above).

Further, products (V) and (VI) obtained by the following reactions of tricarboxylic acid halide monohydride with amidecarboxylic acid can be used as copolymerization components.

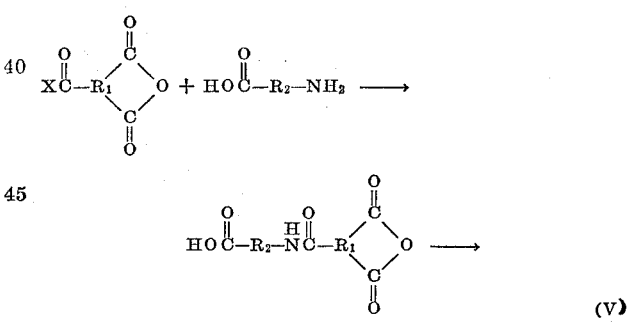

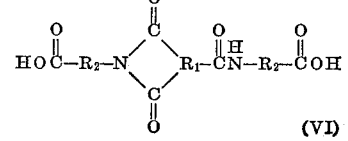

The amounts of (V) and (VI) produced vary in accordance with the molar ratio of the starting materials. As a comonomer starting material (V) or (VI) may be used alone or in a mixture of (V) and (VI). It is also possible to add them in their combined form, as produced, to the aforesaid reaction mixture.

By addition of these comonomers, it is possible to change the ratio of imide rings to amide bonds in the final polymer, whereby it is possible to change crystallinity, orientation and transition point of the final polymer, to improve the fiber, powder and film forming properties, and to improve varnish characteristics and solubility in an organic solvent of the polyamideimides of the present invention.

Further, it is possible to produce the polymer of the present invention by replacing a part of the diisocyanate component with triisocyanate or tetraisocyanate as copolymerization monomers.

Triisocyanate is represented by the general formula

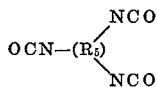

(wherein $R_5$ is a trivalent organic group having at least 3 carbons). $R_5$ is normally an aliphatic, aromatic or alicyclic group; preferably it is an aromatic group. The isocyanate groups bonded to ($R_5$) are bonded respectively to different carbon atoms. Their bonding positions are not otherwise particularly limited.

Tetraisocyanate is what is represented by the general formula

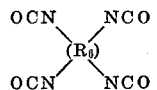

(wherein $R_6$ is a tetravalent organic group having at least 4 carbon atoms).

The four isocyanate groups are bonded respectively to different carbon atoms, however, their bonding positions are not otherwise particularly limited. $R_6$ is normally an aliphatic, alicyclic or aromatic group; however, an aromatic group is preferred.

As these triisocyanates and tetraisocyanates, normally compounds having the following structures are preferably used.

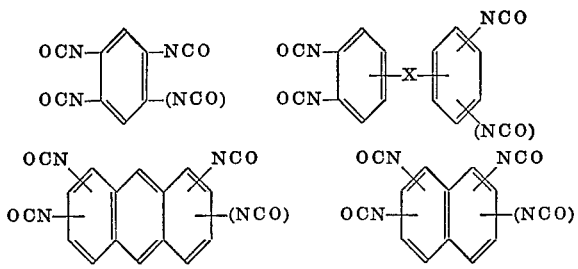

wherein X is as defined in the aforesaid aminocarboxylic acid. The fourth isocyanate group (NCO), may or may not be present depending on whether the compound is triisocyanate or tetraisocyanate.

The bonding positions of the isocyanate groups bonded to the triisocyanates and tetraisocyanates are not particularly limited. However, the reactivity of the compound will definitely be affected. For example if two isocyanate groups are adjacent to one another production of an imidazole ring occurs. If no two isocyanate groups are adjacent one another cross-linking among molecules occurs. In each case, the phenomenon is inevitably connected to the physical properties of the product to be mentioned later. The same can be said of tetraisocyanate. Namely, in the case of tetraisocyanate, wherein out of four isocyanates two isocyanates are bonded to adjacent carbon atoms, production of imidazole rings occurs while cross-linking occurs if the isocyanates are not bonded to adjacent carbon atoms.

As mentioned previously, the polyisocyanate derivative obtained by reaction of a part or whole of an isocyanate group with ROH (wherein R is the same as defined above) may be used with similar effect in the polymerization reaction and it is possible therefore to use said derivative in place of these polyisocyanates.

These polyisocyanates or derivatives thereof are used in amounts of 5–30 mole percent, preferably 10–25 mole percent based on diisocyanate. It goes without saying that, at the same time, it is possible to concurrently use other copolymerization components with reference to the acid components as mentioned above. The conditions for such copolymerization reaction need not particularly be changed from those of the aforesaid homopolymerization. Again, there is no particular limitation as to how the diisocyanate, triisocyanate and tetraisocyanate is added and they may be reacted in combination or alone. It is preferable to remove as much moisture as possible from the polymerization reaction system.

As such, by copolymerization with triisocyanate or tetraisocyanate, it is possible to impart to the polyamideimide of the present invention a high softening point and enhanced chemical resistance.

It is also possible to produce the polyamideimide (I) of the present invention by, for example, the following method in addition to the methods mentioned above.

At first, the imidedicarboxylic acid (II) which is the material monomer of the aforesaid method is acid halogenated and the obtained imidedicarboxylic acid dihalide is reacted with diamine, by which it is possible to produce the polyimideamide of the present invention. As the starting materials of this method, all of such imidedicarboxylic acid as mentioned above may be used. On the other hand, the diamine used is that represented by the general formula $NH_2$—$R_3$—$NH_2$, wherein $R_3$ is as defined above in connection with diisocyanate.

The halogenation of imidedicarboxylic acid is carried out according to a method of producing a normal acid halide. As a halogenating agent, any compound which converts a carboxyl group to a halocarbonyl group may be used. Oxy acid such as phosphorus oxychloride, phosgene and thionyl chloride as well as halogenated phosphorus such as phosphorus trichloride and phosphorus pentachloride may be cited as representative examples.

Next, the halogenated reaction product obtained by the aforesaid method is reacted in a dissolved state with diamine. As the polymerization method, methods known as interfacial polycondensation or low temperature solution polymerization may be used. The latter is preferred.

The solvent used in said low temperature solution polymerization method is such that it makes a uniform system before and after polymerization. For example, those solvents described with respect to the polymerization reaction of said imidedicarboxylic acid (II) with said diisocyanate (III) may be used.

The reaction temperature and the reaction period vary depending upon the combination of the compounds used and the solvent used. However, it is preferable to react the reactants for a period sufficient to produce a polymer of a high degree of polymerization at a temperature below room temperature.

The ratio of the two monomers used is preferably about 1:1. However, some variation is permissible. Needless to say the concurrent use of copolymerization components is also possible. Copolymerization with a polycarboxylic acid component produces especially good results.

A polycarboxylic acid component as herein referred to means the aforesaid tricarboxylic monoanhydride or tetracarboxylic dianhydride. These components may be added in the same amounts and in the same way as described above.

Because this polymerization reaction accompanies dehydrohalogenation, it is preferable to add a dehydrohalogenating agent, for example, an inorganic alkali compound, an organic base such as tertiary amine, or an alkylene oxide.

By using a quaternary ammonium salt, for example, triethylbenzyl ammonium chloride as a catalyst at the time of reaction, it is possible to make the polymerization proceed more smoothly.

In still another method for producing the polyamideimide (I) of the present invention, an iminolactone-dicarboxylic acid, (VII) is reacted with diisocyanate. This reaction proceeds as follows

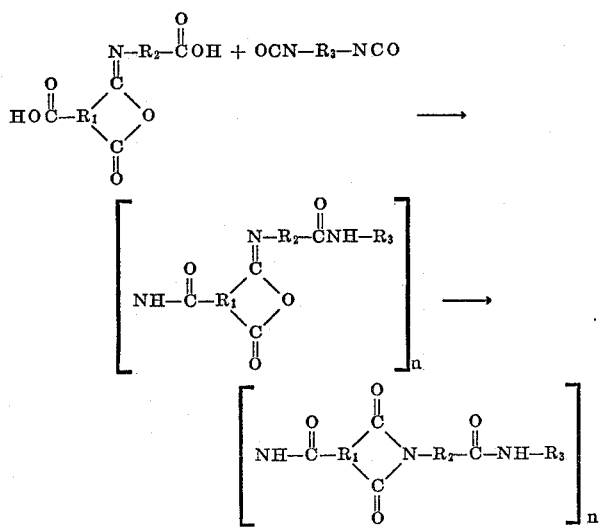

The iminolactonedicarboxylic acid (VII) used in this method is produced, for example, by the following method. At first, an aminocarboxylic acid is reacted with tricarboxylic anhydride to synthesize an adduct (II″) having carboxyl groups at both of its terminals; this reaction may be illustrated as follows (A)

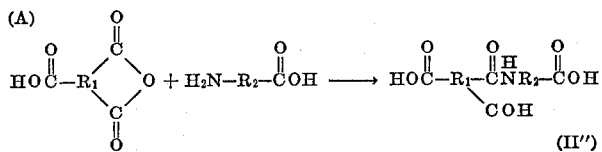

It may be noted that this reaction is the same as the side reaction mentioned in the method of producing imidedicarboxylic acid (II) above.

Next, when the adduct (II″) is ring-closed to an iminolactone ring by a ring closing agent, an iminolactonedicarboxylic acid (VII) is obtained.

(B) II′ Ring Closing Reaction

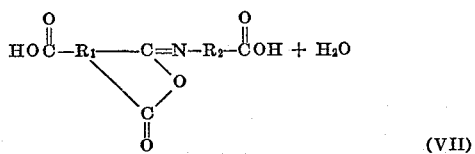

In reactions (A) and (B), formation of an imide ring is avoided by control of reaction conditions such as by selection of proper ring closing agents, reaction temperature, etc. However, imidization to some extent is permissible.

The reaction temperature varies depending upon the kind of compounds used, however, it is generally in the range 10–70° C.

In this reaction, the reaction further proceeds to form an imide ring. Under the reaction conditions of (B) there is nothing which particularly limits anything and the reactants are reacted in a polar solvent such as, for example, alkyl amide, at a temperature of from about −30° C. to about 30° C. Further, a ring closing agent, such as phenyl phosphoric acid, dichloride, phosphorus trichloride and thionyl chloride may be used.

These reactions (A) and (B) may be carried out continuously. However, when necessary they may be carried out intermittently, i.e., it is possible to isolate the product of (A) and subject it to the subsequent reaction (B). Further, it is possible to carry out the polymerization reaction with diisocyanate continuously with reaction (B).

When iminolactone dicarboxylic acid (VII) is treated with alcohol $X_2OH$, as follows,

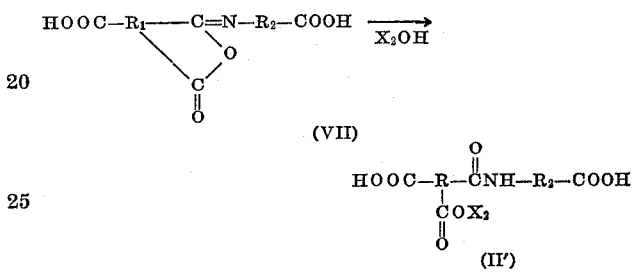

the corresponding carboxylic acid monoester (II′) is obtained by alcoholysis, followed by a ring-opening reaction of the iminolactone. These carboxylic acids (II′) and (VII) can be used as monomers for the polycondensation reactions of the present invention.

The diisocyanates which may be used in this method are those represented by the aforementioned general formula, OCN—$R_3$—NCO (III). Specific examples thereof are cited above.

The two monomers used in the polymerization reaction are preferably used in equimolar proportions. However, some deviation from equimolar proportions is permissible. And normally this polymerization reaction is carried out in an organic solvent. As to the temperature, a temperature within the range of room temperature to 300° C. is preferable. The dislocation of the imide of the iminolactone ring may be caused simultaneously with the polymerization during the polymerization reaction or it may be carried out by a separate heat treatment after the polymerization reaction. Preferably, however, the process conditions are selected such that the iminolactone ring is not displaced during polymerization reaction. It has been found specifically that a reaction temperature of less than 200° C., preferably within the range of 0–150° C. is effective to produce poly(iminolactone-amide). This material may be properly shaped and thereafter heated to produce poly(amideimide). Because the processability of the product of this process is so good this may be called the preferable method. Of course, copolymerization components may also be included in this reaction. Copolymerization with 5–95 mole percent of a polycarboxylic acid component in lieu of an equivalent molar amount of (VII) gives especially preferred results. Typical polycarboxylic acid components for this purpose include dicarboxylic acid, tricarboxylic acid and tetracarboxylic dianhydride.

With reference to diisocyanate also, use of such isocyanate derivatives as mentioned above or addition of triisocyanate or tetraisocyanate as a copolymerization monomer at the time of the polymerization reaction is similarly possible.

Because in the polyamideimide of the present invention, an amide bond to an imide ring is regularly connected in a ratio of 1:2, the large shrinkage and occurrence of crack during hardening which have been held as deficiencies of the conventional polyamideimide are improved. Further, the solubility and the adhesion of the polymer are improved and the shapability of the polymer is good. Still further, the final shaped product has excellent flexural resistance and abrasion resistance. In addition, because the reaction of imidedicarboxylic acid with an isocyanate component is very smooth, a polymer having a high degree of polymerization tends to be obtained. This is an important characteristic. As compared with the conventional polyamideimide, the polyamideimide of the present invention dissolves at a relatively high concentration in an organic solvent. Its uses therefore are extensive including such fields as film, fiber, enamel film, coating composition, shaped article, laminate and foam.

Hereinbelow, the present invention will be explained by examples and comparative examples. In the following, the logarithm viscosity is a value represented by $$\text{Logarithm viscosity} = \frac{\text{Natural logarithm}\left(\frac{\text{Flowing down time of the solution}}{\text{Flowing down time of the solvent}}\right)}{\text{Concentration}}$$

where concentration is the number of grams of the polymer in 100 ml. of the solution. The ordinary viscosity in these examples is based on a measurement at 30° C. in N-methyl-2-pyrrolidone at a concentration of 0.5 g./100 ml.

Comparative example

A comparison was made of the physical properties of a polyamideimide of the present invention, having the following molecular structure

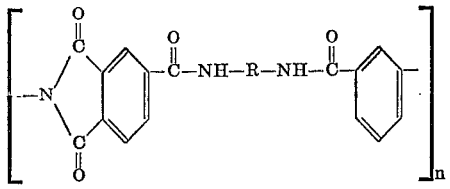

wherein R was 4,4'-diphenylmethane, with polyamideimides as taught in British Pat. 1,032,649 having similar structures wherein R was p-phenylene and m-phenylene, respectively. The superior properties of the polyamideimide of the present invention are shown in Table 7, which follows.

under a reduced pressure and purified. Of the purified powder, 1.5562 parts were added to a separately prepared solution obtained by dissolving 1.2611 parts of 4,4'-diphenylmethane diisocyanate in 10 parts of N-methylpyrrolidone. This solution was stirred at 180–200° C. for 8 hours to produce a polymer having an inherent viscosity of 0.52. This polymer solution was treated on a glass plate at 300° C. for 20 minutes to obtain a brown film. The tenacity and elongation of the film were 11.0 kg./mm.$^2$ and 7.0% and the tear resistance was 0.20 kg./mm.

Example 2

In 20 parts of N-methylpyrrolidone, 5.4852 parts of m-aminobenzoic acid were dissolved and to the resultant solution 7.6848 parts of trimellitic anhydride in a solid state were added. After stirring this solution at room temperature for 3 hours, 6.7276 parts of hexamethylene diisocyanate in a solid state was added and the temperature of the resulting solution was elevated to 200° C., at which temperature it was stirred for 6 hours. The $\eta_{inh}$[1] of this polymer was 0.86. The polymer solution thus produced was coated to a thickness of 40 microns around a copper wire baked at 300° C. for 60 seconds. In a standard anti-abrasion test (600 g load) this coating withstood 196 cycles.

Examples 3–18

As listed in Table 1, a variety of reactants, reaction media, and reaction conditions have been used to obtain a variety of polyamideimides excellent in heat resistance and abrasion resistance.

(Table 1 in columns 13 and 14.)

Example 19

In 220 parts of N-methylpyrrolidone, 19.2 parts of trimellitic anhydride was dissolved and to the resultant solution 13.8 parts of P-aminobenzoic acid in a solid state was added. This solution was stirred at room temperature for 2 hours and thereafter the temperature was

TABLE 7

| Properties | Measuring method | R is —⌬— | R is ⌬ | R is —⌬—CH$_2$—⌬— |
|---|---|---|---|---|
| Tenacity, kg./mm. | ASTM-D882-64T | | 10.5 | 12.2. |
| Elongation, percent | ASTM-D882-64T | | 4.0 | 16.0. |
| Initial modulus of elasticity, kg./mm. | ASTM-D882-64T | | | 400. |
| Tear resistance, kg./mm. | | | 330 | 392. |
| Flexural resistance, times | JIS-8115 | | 130 | 6,000. |
| Kinetic modulus of elasticity, kg./mm. | Viscoelasticity spectrometer | | 240 | 350. |
| Dielectric constant, 22° C, 1 kc. | ASTM150-64T | | 4.80 | 4.32. |
| Tan, 22° C., 1 kc. | | | 0.0095 | 0.0021. |
| Dielectric breakdown voltage, kv./mm. | ASTMD-149-64 | | 80 | 161. |
| Volume resistivity, Ω-cm. | ASTMD-257-61 | | 1.8×10$^{15}$ | 3.3×10$^{16}$. |
| Chemical resistance | Boiled in a 5% aqueous solution of caustic soda. | Not changed | Not changed | Not changed. |
| Softening point, °C. | According to the measured result of kinetic viscoelasticity. | 290 | 280 | 310. |
| Inherent viscosity ($\eta_{inh}$) | NHP, 30° C., 0.5% | <0.1 | 0.4–0.6 | 0.9–1.2. |
| Stability of enamel varnish, poise. | Solution viscosity change at 30° C. for 30 days (initial 2,000 poise). | Low (10) (viscosity decrease). | Low (15) (viscosity decrease). | High (2,000) (no change in viscosity). |
| Film forming property | Onto glass plate | None | Medium | High. |

Example 1

In 20 parts of N,N'-dimethyl acetamide, 1.9212 parts of trimellitic anhydride was dissolved and to the resultant solution 1.3912 parts of P-aminobenzoic acid in a solid state was added. This solution was stirred at room temperature for 2 hours and thereafter the temperature was gradually elevated to 200° C., at which temperature the solution was reacted for 2 hours. The reaction mixture was then added to 200 cc. of water to obtain white powder. This white powder was dried at 250–300° C.

gradually elevated to 200° C., at which temperature it was reacted for 2 hours. Then, 25.025 parts of 4,4'-diphenylmethane diisocyanate and 19.2 parts of trimellitic anhydride were added and when the resulting solution was stirred at 160° C. for 1 hour, a viscous polymer solution was obtained.

A part of said polymer solution was taken and made into a film on a glass plate at 120° C. for 10 minutes and then heat treated at 280–300° C. for 15 minutes.

[1] Inherent viscosity.

3,682,860

TABLE 1

| Example | Tricarboxylic anhydride | Aminocarboxylic acid | Solvent | Reaction temperature time | Diisocyanate | Polymerization temperature-time | η inh | Ring closing treatment |
|---|---|---|---|---|---|---|---|---|
| 3 | Trimellitic anhydride, 3.8424 parts. | P-amino 4 carboxy cyclohexane, 2.8434 parts. | N-methyl pyrrolidone, 10 parts. | 30° C., 3 hrs | Tetramethylene diisocyanate, 2.8028 parts. | 203° C., 6 hrs | 0.52 | 350° C./10 min. |
| 4 | Cyclopropane tricarboxylic anhydride, 12.41 parts. | P-aminobenzoic acid, 13.713 parts. | N-methyl pyrrolidone, 30 parts. | 35° C., 3 hrs | Diphenylmethane 4,4'-isocyanate, 25.025 parts. | 203° C., 5 hrs | 0.83 | 300° C./20 min. |
| 5 | 2,3,6-naphthalene tricarboxylic anhydride, 28.62 parts. | n-Aminobenzoic acid, 13.713 parts. | Dimethyl acetamide, 40 parts. | 25° C., 3 hrs | Tolylene diisocyanate, 17.416 parts. | 160° C., 7 hrs | 0.74 | 250° C./20 min. |
| 6 | Trimellitic anhydride, 9.606 parts. | P-aminobenzoic acid, 6.856 parts. | Hexamethyl phosphoramide, 30 parts. | 25° C., 3 hrs | Dicyclohexyl methane 4,4' diisocyanate, 12.91 parts. | 250° C., 6 hrs | 0.66 | 400° C./10 min. |
| 7 | Trimellitic anhydride, 76.848 parts. | 4(4-aminophenoxy) benzoic 91.692 parts. | Dimethylacetamide, 300 parts. | 40° C., 2 hrs | Cyclohexanone 1,4-diisocyanate, 65.664 parts. | 150° C., 8 hrs | 0.72 | 350° C./10 in. |
| 8 | 2,3,5-naphthalene tricarboxylic anhydride, 13.310 parts. | 5-carboxy-1-aminonaphthalene, 10.662 parts. | N-methyl pyrrolidone, 40 parts. | 20° C., 4 hrs | Hexamethylene diisocyanate, 8.409 parts. | 200° C., 7 hrs | 0.88 | 300° C./30 min. |
| 9 | Trimellitic anhydride, 19.212 parts. | m-Aminobenzoic acid, 13.713 parts. | N-methyl pyrrolidone, 50 parts. | 23° C., 3 hrs | Diphenylether 4,4'-diisocyanate, 25.222 parts. | 200° C., 8 hrs | 0.23 | 330° C./10 min. |
| 10 | 2,8,5-pyrazine tricarboxylic anhydride, 38.820 parts. | 2-amino-5-naphthaline carboxylic acid, 37.438 parts. | Dimethyl sulfoxide, 118.3 parts. | 30° C., 2 hrs | 1,5-naphthalene diisocyanate, 42.086 parts. | 189° C., 10 hrs. (Catalyst: 0.316 parts pyridine). | 0.76 | 400° C./20 min. |
| 11 | 3,4,4'-tricarboxy biphenylether anhydride, 56.842 parts. | 1-amino-4-cyclohexane carboxylic acid, 28.636 parts. | Diethyl formamide, 887.9 parts. | 50°C., 2 hrs | 3,3'-dimethoxy 4-4' biphenyl diisocyanate, 59.254 parts. | 178° C., 15 hrs. (Catalyst: 2,984 parts triethanol amine). | 0.55 | 250° C./30 min. |
| 12 | Naphthalene 2,3,6 tricarboxylic anhydride, 48.234 parts. | 1-aminohexamethylene-4-carboxylic acid, 29.040 parts. | {N-methylcaprolactam, 138.3 / N-methylpyrrolidone, 419.4 parts.} | 30° C., 1 hr | 3,3'-dichloro-4,4'-biphenyl diisocyanate, 61.022 parts. | 200° C., 10 hrs. (Catalyst: 0,930 parts triethylene-diamine). | 1.45 | 250° C./10 min. |
| 13 | 2,3,5-naphthalene tricarboxylic anhydride, 48.234 parts. | 4-amino-4'-carboxybiphenyl sulfone, 55.458 parts. | Dimethyl sulfone, 109.2 parts. | 80° C., 2 hrs | 4,4'-diphenyl sulfone diisocyanate, 60.056 parts. | 18 C., 12 hrs. (Catalyst: 0.405 parts triethyl amine). | 0 95 | Acetic anhydride 1/pyridine 1, 100° C./30 min. |
| 14 | Trimellitic anhydride, 38.424 parts. | 4-amino-4'-carboxybiphenyl ketone, 48.248 parts. | Trimethyl phosphate, 118.7 parts. | 10° C., 10 hrs.; 50° C., 1 hr. | Diphenyl methane 4,4'-diisocyanate, 50.06 parts. | 190° C., 5 hrs. (Catalyst: N-methyl morpholine 2,023 parts). | 1.05 | Acetic anhydride 1/pyridine 1, 30° C./5 hrs., 200° C./10 hrs. |
| 15 | 3,4,4'-biphenyl sulfone tricarboxylic anhydride, 66.454 parts. | 1-amino-hepta methylene-5-carboxylic acid, 31.844 parts. | N-methyl piperidone, 521.3 parts. | 50° C., 5 hrs | Diphenylether-4,4'-diisocyanate, 47.24 parts. | 210° C., 5 hrs. (Catalyst: 2.506 parts cobalt naphthenate). | 1.25 | 300° C./10 min. |
| 16 | 3,5,4-tricarboxy benzophenone anhydride, 59.244 parts. | 4-amino-4'-carboxy-diphenyl methane, 45.450 parts. | Hexamethyl phosphoramide 310.3 parts. | 100° C., 1.5 hrs | {4,4'-diphenylether diisocyanate, 50.444 parts. / 4,4'-diphenyl methane diisocyanate, 50.050 parts.} | 150° C., 5 hrs. / 190° C., 10 hrs. (Catalyst: 1.218 parts sodium oleate). | 0.98 | 250° C./10 min. |
| 17 | {Trimellitic anhydride, 38.424 parts. / 2,4,4'-biphenyl ethertricarboxylic anhydride, 56.662 parts.} | 4-amino-4'-carboxy-diphenyl, 42.646 parts. | N-methyl pyrrolidone, 157.5 parts. | 120° C., 0.5 hr. | Anthraquinone 2.6-diisocyanate, 68.044 parts. | 200° C., 5 hrs. (Catalyst: 1.218 parts sodium oleate). | 1.15 | Polyphosphoric acid, 200° C./10 min. |
| 18 | 1,4,5-naphthalene carboxylic anhydride, 48.234 parts. | {m-Aminobenzoic acid, 27.426 parts, / p-Aminobenzoic acid, 27.426 parts.} | Dimethyl formamide, 517.3 parts. | 130° C., 0.5 hr. | Diphenylsulfide 4,4'-diisocyanate, 53.656 parts. | 158° C., 15 hrs. (Catalyst: 0.848 parts lithium chloride). | 0.65 | 300° C./20 min. |

The measured values of certain of the physical properties of this film are shown in Table 2.

TABLE 2

| Physical property | Measuring method | Measured value |
|---|---|---|
| Tenacity, kg./mm.² | ASTM D882-64T | 13. |
| Elongation, percent | ASTM D882-64T | 15. |
| Dielectric constant, 22° C./kc. | ASTM D150-64T | 4.48. |
| Dielectric breakdown voltage, kv./mm. | ASTM D119-64 | 150. |
| Tan δ, 22° C./kc. | ASTM D150-64T | 0.0021. |
| Chemical resistance | Boiled in a 30% aqueous solution of caustic soda for 30 minutes | Not changed. |
| Softening point, °C | Measured results of kinetic viscoelasticity. | 310. |
| η inh | | 0.82 |

Example 20

In 500 parts of N-methylpyrrolidone, 27.424 parts of m-aminobenzoic acid were dissolved and the resultant solution was cooled to 0° C. To this solution, 39.424 parts of trimellitic anhydride were added. The solution was then stirred for 1 hour and then heated at 190–200° C. for 2 hours. Water produced in the reaction was distilled off. At this time, the water content in the system was 480 p.p.m. Upon cooling the reaction solution to 100° C., 94.275 parts of N,N'-dimethoxycarbonyldiphenylmethane-4,4'-diamine and 15.20 parts of trimellitic anhydride were added thereto and the solution was then heated at 190–200° C. for 5 hours.

Methanol and carbon dioxide produced in the course of the reaction were of course separated and removed from the system. A part of the polymeric product was dissolved in cresol and this solution was directly applied to the surface of a soft copper wire having a diameter of 1.0 mm. and baked by a normal method to form an insulated paint layer. The insulated wire wound well around a wire of the same diameter and in a standard abrasion frequency test, under a load of 700g, it withstood 200 cycles.

EXAMPLE 21

In a polymerization reaction similar to that described in Example 19, 8.11 parts (45 mole percent of pyromellitic dianhydride was used instead of trimellitic anhydride (9.46 parts—55 mole percent). The η inh of the polymeric product was 0.65. From the polymer solution a film was made as in Example 1. This film had a dielectric breakdown voltage of 180 kv./mm., an elongation of 12% and a tenacity of 13.5 kg./cm.

EXAMPLE 22

In 20 parts of N-methylpyrrolidone, 5.4852 parts of m-aminobenzoic acid were dissolved and to the resultant solution, 7.6848 parts of trimellitic anhydride in a solid state were added.

This solution was stirred at room temperature for 0.5 hour and at 190° C. for 2 hours. Thereafter, to said solution, 13.5 parts of hexamethylene diisocyanate and 7.7 parts of trimellitic anhydride, both in solid state, were added. The temperature of the resulting solution was elevated to 200° C., at which temperature it was stirred for 6 hours. The logarithm viscosity of the resulting polymer was 0.92.

EXAMPLES 23–31

Following the procedure described in Example 20, polymerization processes were carried out under conditions shown in Table 3. From the polymer solutions thus obtained, films were made as in Example 1 and the dielectric breakdown voltages of these films were measured. These voltages and the $\eta_{inh}$ of the reaction product are shown in Table 3.

EXAMPLE 32

A three-neck flask equipped with a condenser, a nitrogen inlet and a stirrer was charged with 250 parts of N-methylpyrrolidone to which 38.42 parts of trimellitic anhydride and 27.43 parts of P-aminobenzoic acid were added. The resultant solution was stirred for 30 minutes and its temperature was then elevated to 150° C. at which temperature the solution was reacted for 2 hours while distilling off water to remove it from the reaction system. When the quantity of this distilled water was estimated by Carl Fischer reagent, the results indicated that water came from the portion of amide acid converted to imide came out almost quantitatively. Infrared absorption analysis of a part of the reaction solution showed absorption bands at 5.64 microns and 5.89 microns attributable to the imide ring and absorption by the amide bond at 6.02 microns was completely lost. After the temperature of this reaction solution was lowered to 100° C., 21.0 parts of diphenylmethane (4,4',1-diisocyanate) and 5.5 parts of diphenylmethane (3,4,4')-triisocyanate both in solid state were added thereto and the resultant mixture was polymerized at 190° C. for 2 hours. The polymer was then cast on a glass plate and made into a film at 120° C. for 10 minutes. The film was further heat treated at 280–300° C. for 15 minutes to completely remove the solvent. The physical properties of this film was shown in Table 4.

TABLE 4

Physical properties: Film of Example 32
- $\eta_{inh}$ of the polymer — 1.51
- Softening point (Tg) (°C.)[1] — 420
- Chemical resistance (immersed in 3% NaOH solution at 50° C. for 1 hour) — Not changed
- Tenacity (kg./mm.) — 19.5
- Tear dissemination resistance (kg./mm.)[2] — 0.40
- Flexural resistance[3] — 6,200 times

[1] Measured result of kinetic viscoelasticity.
[2] JIS P-8116.
[3] JIS P-8115.

Example 33

In 200 parts of N-methylpyrrolidone, 13.717 parts of P-aminobenzoic acid were dissolved. To this solution, 19.21 parts of trimellitic anhydride were added at 10° C. and the solution was stirred at room temperature for 30 minutes. Thereafter, the temperature was gradually elevated to 200° C., at which temperature the solution was reacted for 2 hours. Water produced in the reaction was distilled off and the water content in the reaction system was about 300 p.p.m. Infrared analysis indicated that the

TABLE 3

| Example | Tricarboxylic anhydride | Aminocarboxylic acid | Solvent | Isocyanate | Reaction temperature period | Copolymerization acid component | Polymerization temp. period | $\eta_{inh}$ | Dielectric breakdown voltage (kv./mm.) |
|---|---|---|---|---|---|---|---|---|---|
| 23 | Trimellitic anhydride, 38.424 parts. | 4-amino-4'-carboxy biphenylketone, 48.248 parts. | N-methyl pyrrolidone, 300 parts. | Diphenyl sulfone 4,4'-diisocyanate, 178.30 parts. | 190° C., 3 hrs. | Trimellitic anhydride, 19.212 parts. | 170° C., 1 hr. | 0.91 | 142 |
| 24 | do | do | do | Bis 2,2'-diphenyltriisocyanate-4,4'-diisocyanate, 166.90 parts. | do | 2,2',3-biphenyltricarboxylic anhydride, 26.8 parts. | 170° C., 1 hr. | 0.80 | 138 |
| 25 | Trimellitic anhydride, 9.606 parts. | m-Aminobenzoic acid, 6.856 parts. | Hexamethylphosphoramide, 30 parts. | N,N'-diethoxycarbonyl dicyclohexylmethane-4-4'-diamine, 34.0 parts. | 190° C., 1.5 hrs. | (2,3-dicarboxyphenyl) (2-carboxyphenyl) methane anhydride, 14.2 parts. | 180° C., 1.5 hrs. | 0.97 | 148 |
| 26 | 1,4,5-naphthalene tricarboxylic anhydride, 48.23 parts. | m-Aminobenzoic acid, 27.426 parts. | N-methyl pyrrolidone, 200 parts. | N,N'-dimethoxycarbonyl 4,4'-diaminodiphenyl ether, 95.4 parts. | 30° C.–190° C., 4 hrs. | 2,3,5 naphthalene tricarboxylic anhydride, 25.0 parts. | 190° C., 7.0 hrs. | 0.68 | 150 |
| 27 | do | do | do | do | 30° C.–190° C., 4 hrs. | Napthalene 1, 2,4,5-tetracarboxylic dianhydride, 25.5 parts. | 180° C., 5.8 hrs. | 0.50 | 148 |
| 28 | 3,3',4-tricarboxybenzophenone anhydride, 59.24 parts. | 4-amino-4'carboxy diphenyl-methane, 45.45 parts. | Dimethyl acetamide, 200 parts. | 4,4'-diphenylmethane diisocyanate, 100.0 parts. | 180° C., 2 hrs. | 3,3',4,4'-biphenyl tetracarboxylic dianhydride, 27.5 parts. | 175° C., 2.0 hrs. | 0.89 | 174 |
| 29 | do | do | do | do | do | 3,3'-methylendiphthalic dianhydride, 31.0 parts. | 150° C., 35 hrs. | 1.01 | 192 |
| 30 | Trimellitic anhydride, 38.42 parts. | 4-amino-4'-carboxy biphenylsulfone, 55.46 parts. | N-methyl caprolactam, 400 parts. | N,N'-dimethoxycarbonyl-4,4'-diaminodiphenyl methane, 126.4 parts. | 195° C., 3 hrs. | Trimellitic anhydride, 18.42 parts. | 170° C., 15 hrs. | 0.70 | 183 |
| 31 | 3,4,4'-biphenylsulfone tricarboxylic anhydride, 66.45 parts. | 1-amino-heptamethylene-5-carboxylic acid, 31.84 parts. | N-methyl piperidone, 1,500 parts. | Diphenyl sulfone-3,3'-diisocyanate, 123.50 parts. | 210° C., 4 hrs. | 3,4,4'-biphenylsulfone tricarboxylic anhydride, 66.45 parts. | 190° C., 3 hrs. | 1.23 | 181 | reaction product was completely imidized. To the imidized reaction product, 27.05 parts of N,N'-dimethoxycarbonyl-4,4'-diaminodiphenylmethane, 4.80 parts of diphenyl-(3,4,4')-triisocyanate and 5.0 parts of triethylene diamine, each separately prepared, were added and the resultant solution was stirred at 180-200° C. for 5 hours. The polyamideimide solution thus produced was applied to a copper wire having a diameter of 1 mm. and dried. Thereafter, it was heated to 300° C. to bake the coating and to remove the solvent therefrom. Then it was heated to 200° C. for 16 hours. Thereafter, when the coated wire was wound around a wire having the same diameter, it did not break down due to said winding. And in a standard abrasion resistance test (at room temperature under a load of 600g) it withstood 250 cycles. Even when this enamel wire was boiled in a 10% aqueous solution of caustic soda, the coating evidenced no change.

Example 34

In a process as described in Example 33, 0.16 mole of diphenylmethane(3,4,4,4')-tetraisocyanate were used instead of diphenyl(3,4,4')-triisocyanate. The $\eta_{inh.}$ of the resultant polymer was 1.40. In the abrasion resistance test of the coated electric cable produced as in Example 33, it withstood 285 cycles. The alkali resistance thereof was the same as that in Example 33 in that the cable did not change.

Examples 35-42

One mole of each of the imidedicarboxylic acids shown in Table 5 was dissolved in the solvent indicated and the resultant solutions were heated. One mole of specific isocyanates, identified in Table 5 was added to the identified solutions and the resultant solutions were polymerized under the conditions shown. Each component was so charged that the concentration of the solvent was 42%. The breakdown of the 1 mole of isocyanate in each case was 0.85 mole of diisocyanate and 0.15 mole of triisocyanate or tetraisocyanate.

Where three kinds of isocyanate were added simultaneously, the breakdown was 0.8 mole of diisocyanate, 0.15 mole of triisocyanate and 0.05 mole of tetraisocyanate. Films were made as in Example 32. The results are shown in Table 5.

TABLE 5

| Ex. | Imidecarboxylic acid | Solvent | Isocyanate | Polymerization conditions, temp./hrs. | $\eta_{inh}$ of the polymer | Softening point (° C.) | Tenacity (kg./mm.) |
|---|---|---|---|---|---|---|---|
| 35 | [structure: HOOC-naphthalene-imide-N-phenyl-COOH] | N-methyl pyrrolidone. | 1+7 | 185/2.5 | 1.23 | 410 | 18.5 |
| 36 | [structure: HOOC-phenyl-O-phenyl-C(=O)-N-phenyl-COOH imide] | do | 2+12+11 | 190/13 | 1.20 | 425 | 21.5 |
| 37 | [structure: HOOC-phthalimide-N-M-COOH] | Hexamethyl phosphoramide. | 3+8 | 185/3.0 | 1.41 | 405 | 19.8 |
| 38 | [structure: HOOC-phthalimide-N-phenyl-CH$_2$-phenyl-COOH] | Dimethyl acetamide. | 4+11 | 180/2 | 1.51 | 398 | 20.0 |
| 39 | [structure: HOOC-phenyl-C(=O)-N-phenyl-imide-phenyl-COOH] | N-methyl pyrrolidone. | 5+13 | 220/1 | 1.40 | 410 | 18.1 |
| 40 | [structure: HOOC-phthalimide-N-(CH$_2$)$_6$-COOH] | do | 6+14 | 200/2 | 1.32 | 415 | 17.9 |

3,682,860

TABLE 5—Continued

| Ex. | Imidecarboxylic acid | Solvent | Iso-cyanate | Polymerization conditions, temp./hrs. | $\eta_{inh}$ of the polymer | Film characteristics Softening point (° C.) | Tenacity (kg./mm.) |
|---|---|---|---|---|---|---|---|
| 41 | HOOC-[structure with imide ring]-N-[naphthalene]-COOH | ...do... | 2+16+10 | 191/2.5 | 1.48 | 430 | 22.0 |
| 42 | HOOC-[structure with imide ring]-N-[biphenyl]-COOH | ...do... | 1+9+15 | 175/40 | 1.84 | 435 | 21.5 |

1. Hexamethylene-(1,6)-diisocyanate.
2. Toluylene(2,4)-diisocyanate.
3. Diphenylmethane (4,4')-diisocyanate.
4. Diphenylether (4,4')-diisocyanate.
5. 1-methoxybenzene-2,4-diisocyanate.
6. Napthylene (1,5)-diisocyanate.
7. Benzene (1,3,5) triisocyanate.
8. Diphenylmethane (3,4,4') triisocyanate.
9. Diphenylether (3,4,4') triisocyanate.
10. Naphthalene (1,2,7) triisocyanate.
11. Diphenyl (3,3',5) triisocyanate.
12. Benzene (1,2,3,5) tetraisocyanate.
13. Diphenylmethane (3,3',4,4') tetraisocyanate.
14. Diphenylether (3,3',4,4') tetraisocyanate.
15. Naphthalene (1,2,5,6) tetraisocyanate.
16. Diphenyl (3,3',4,4') tetraisocyanate.

Example 43

In 150 parts of tetrahydrofuran, 13.71 parts of P-aminobenzoic acid were dissolved and to the resultant solution, 19.21 parts of trimellitic anhydride were added. At this time, in order that the temperature of the reaction solution might not become more than 30° C., the reaction system was cooled by an ice water bath. After stirring the solution at room temperature for 1 hour, 15 parts of dimethyl formamide were added thereto and after making the reaction solution uniform, 22 parts of dicyclohexyl carbodiimide dissolved in 200 parts of tetrahydrofuran were added dropwise thereto. After stirring this solution at room temperature for 4 hours, the precipitated dicyclohexyl urea was filtered and removed. The filtrate was added to a quantity of n-hexane 3 times that of the filtrate. The following compound was obtained.

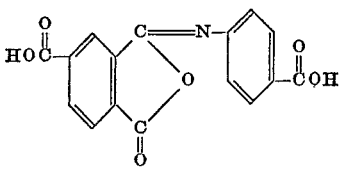

In 5.0 parts of N-methylpyrrolidone, 3.112 parts of this compound were dissolved and to the resultant solution, 2.502 parts of diphenylmethane-4,4'-diisocyanate were added. When this solution was stirred at 190° C. for 3 hours, a viscous polymer solution was obtained. The inherent viscosity of this polymer was 1.10. When this polymer was subjected to infrared analysis, absorption due to iminolactone ring was not apparent. A part of this polymer was then cast on a glass plate, dried at 100° C. for 20 minutes and further heat treated at 280–300° C. for 15 minutes to make a film. In the infrared spectrum of this film, the characteristic absorption of an imide bond was observed at 5.64 microns and 5.89 microns and the characteristic absorption of an amide bond was observed at 6.02 microns. The various physical properties of this film are shown in Table 6.

Example 44

In 500 parts of tetrahydrofuran and 50 parts of dimethyl formamide, 27.42 parts of P-aminobenzoic acid were dissolved. To the resultant solution, 38.42 parts of trimellitic anhydride were added and the resultant solution was stirred at room temperature for 1 hour. The salted out precipitate was filtered and dried and thereafter, to the dried filtrate, 200 parts of benzene were added; further, 200 parts of thionyl chloride was gradually added; thereto. This solution was then refluxed for 4 hours and the precipitate therefrom was filtered. This filtrate was washed by petroleum ether and then dried at 80° C. for 5 hours.

This dried filtrate was then added, at room temperature, to a solution produced by dissolving 39.64 parts of 4,4'-diaminodiphenylmethane in 600 parts of N-methylpyrrolidone and adding thereto, dropwise, 20 parts of propylene oxide. The resulting solution was stirred for 2 hours. The $\eta_{inh}$ of this polymer was 1.20. A part of this polymer solution was cast on a glass plate and was removed therefrom. In the infrared analysis of this film, the characteristic absorption of an imide bond was observed at 5.64 microns and 5.89 microns and the characteristic absorption of an amide bond was observed at 6.02 microns. The physical properties of this film are shown in Table 6.

TABLE 6

| Measured items | Measuring method | Example 43 | Example 44 |
|---|---|---|---|
| Tenacity, kg./mm. | ASTM-D882-64T | 13.0 | 15.2 |
| Elongation, percent | ASTM-D882-64T | 20.0 | 18.0 |
| Initial modulus of elasticity, kg./mm. | ASTM-D882-64T | 400 | |
| Tear resistance, kg./mm. | | 392 | 337 |
| Flexural resistance, times. | JIS-8115 | 6,000 | 4,000–4,500 |
| Kinetic modulus of elasticity, kg./mm. | Viscoelasticity spectrometer. | 350 | |
| Dielectric constant, 22° C., 1 kc. | ASTM150-64T | 4.32 | |
| Tan δ, 22° C., 1 kc | | 0.0021 | |
| Dielectric breakdown voltage, kv./mm. | ASTMD-149-64 | 161 | |
| Volume resistivity, Ω-cm. | ASTMD-257-61 | $3.3 \times 10^{16}$ | |
| Chemical resistance | Boiled in a 5% aqueous solution of caustic soda. | (¹) | (¹) |
| Softening point, ° C. | According to the measured result of kinetic viscoelasticity. | 310 | 360 |

¹ Not changed.

Example 45

In a mixture of 100 parts of N,N'-dimethyl acetamide and 300 parts of N-methyl pyrrolidone, 30.17 parts of p-aminobenzoic acid were dissolved. To this solution 42.26 parts of trimellitic anhydride were added. The solution was then stirred at room temperature for one hour and thereafter heated at 180° C. for 3 hours, at which temperature reaction took place and water produced in the reaction was distilled out of the reaction system. Separately in 200 parts of N-methyl pyrrolidone, 24.68 parts of p-aminobenzoic acid were dissolved. To this solution, 39.26 parts of pyromellitic dianhydride, in a solid state, was added and the obtained solution was stirred at room temperature for 1 hour and at 190–200° C. for 1 hour. At this temperature, a reaction took place and water produced in the reaction was removed, by distillation from the reaction mixture. The two above mentioned reaction mixtures were mixed and to the resultant mixture 25.22 parts of diphenyl ether -4,4'-diisocyanate and 100 parts of N-methyl pyrrolidone were added. This solution was then polymerized at 170° C. for 3 hours and the polymeric product had an $\eta_{inh.}$ of 0.98. A part of the polymer solution was cast on a glass plate and made into film by treating at 125° C. for 30 minutes, and then at 320° C. for 10 minutes. In the infrared analysis of this film, the characteristic absorption of an imide bond was observed at $5.64\mu$ and $5.89\mu$ and the characteristic absorption of an amide bond was observed at $6.02\mu$. The tenacity and elongation of this film was 19 kg./mm.$^2$ and 20% respectively.

Example 46

In a mixture of 50 parts of tetrahydrofurave and 500 parts of N,N'-dimethylformamide, 16.46 parts of m-aminobenzoic acid were dissolved. To this solution, 26.17 parts of trimellitic acid anhydride and 20 parts of propylene oxide were added. The solution was then stirred at room temperature for 30 minutes. To this solution were then added, 200 parts of N-methyl pyrrolidone, 41.60 parts of p-aminobenzoic acid and 53.76 parts of trimellitic anhydride. Thereafter, the resultant solution was reacted at 150° C. for 5 hours and water produced in this reaction was distilled off together with tetrahydrofurave.

To the above reaction mixture, 36.60 parts of 2,4-tolylene diisocyanate in a solid state were added and the mixture was then polymerized with stirring at 160° C. for 5 hours.

The polymer product had a $\eta_{inh.}$ of 1.24. In the infrared analysis of the film made from the polymer at 150° C. for 30 minutes and 320° C. at 10 minutes, the characteristic absorption of the imide bond was observed at $5.64\mu$ and $5.89\mu$ and the characteristic absorption of the amide bond was observed at $6.02\mu$.

Example 47

In 100 parts of N-methyl pyrrolidone, 16.85 parts of trimellitic acid anhydride chloride were dissolved and to the resultant solution 20 parts each of propylene oxide and m-aminobenzoic acid was separately added. This solution was stirred at room temperature for 30 minutes and at 200° C. for 30 minutes. To this system, 43.88 parts of m-aminobenzoic acid, 61.50 parts of trimellitic anhydride, and 500 parts of N-methyl pyrrolidone were added. The resultant solution was stirred at 180 to 190° C. for 2 hours and thereafter cooled to 100° C. To it were added 20.02 parts of diphenylmethane-4,4'-diisocyanate. The solution thus obtained was polymerized at 190–200° C. for 3 hours.

There resulted a polymer, having a $\eta_{inh.}$ of 1.15, which was cast and treated on a glass plate, at 150° C. for 20 minutes and at 300° C. for 30 minutes, to obtain a film.

In the infrared analysis of this film, the characteristic absorption of the imide bond was observed at 5.64 and 5.89, and the characteristic absorption of the amide bond was observed at 6.02. The tenacity and elongation of this film was 22 kg./mm.$^2$ and 18% respectively.

Example 48

Iminolactone dicarboxylic acid (VII) obtained in Example 43 (105 parts) was treated with 850 parts of ethanol in the presence of a trace of sulfuric acid as an esterifying reagent at 80° C. for 5 hours to obtain monoethyl ester of the following tricarboxylic acid monoethylester.

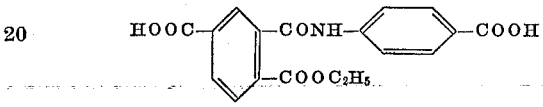

In 50 parts of N-methyl pyrrolidone, 34.33 parts of this compound was dissolved and 25.02 parts of diphenylmethane-4,4'-diisocyanate was added, and the solution was stirred at 200–210° C. for 5 hours. The polymerization was proceeded by removal of ethanol during the polymerization to obtain a viscous polymer solution. The polymer solution was casted onto a glass plate, and after curing the film at 300–315° C. for 20 minutes, a tough transparent film was obtained. The inherent viscosity of the polymer was found to be 1.30 measured in N-methyl pyrrolidone at 30° C. and 0.5 polymer concentration. A polyamideimide structure identical with the polymer obtained in Example 43 was confirmed by infrared spectrum, chemical and elemental analyses.

The physical properties of the resultant film are summarized in Table 8.

TABLE 8

| Properties | Measuring method | Example 23 | Example 44 | Example 48 |
|---|---|---|---|---|
| Tenacity, kg./mm. | ASTM-D882-64T | 13.0 | 15.2 | 15.1 |
| Elongation, percent | ASTM-D882-64T | 20.0 | 18.0 | 16.0 |
| Initial modulus of elasticity, kg./mm. | ASTM-D882-64T | 400 | | 400 |
| Tear resistance, kg./mm. | | 392 | 337 | 392 |
| Flexural resistance, times | JIS-8115 | 6,000 | 4,000–4,500 | 5,000 |
| Kinetic modulus of elasticity, kg./mm. | Viscoelasticity spectrometer | 350 | | 300 |
| Dielectric constant, 22° C., 1 kc | ASTM150-64T | 4.32 | | 4.32 |
| Tan, 22° C., 1 kc | | 0.0021 | | 0.002 |
| Dielectric breakdown voltage, kv./mm. | ASTMD-149-64 | 161 | | 150 |
| Volume resistivity, Ω-cm | ASTMD-257-61 | 9.3×10$^{16}$ | | 9.3×10$^{15}$ |
| Chemical resistance | Boiled in a 5% aqueous solution of caustic soda | (1) | (1) | (1) |
| Softening point, ° C | According to the measured result of kinetic viscoelasticity | 310 | 360 | 310 |

[1] Not changed.

What is claimed is:
1. Polyamideimide, excellent in heat resistance, consisting of a composition of the formula

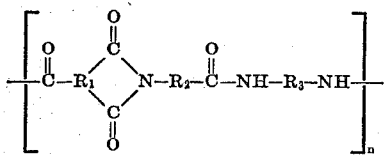

wherein $R_1$ is a trivalent benzoid group selected from the group consisting of

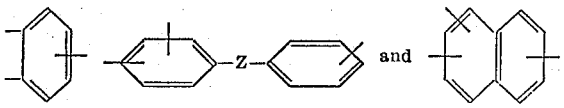

wherein Z is a carbon-carbon bond, an alkylene group,

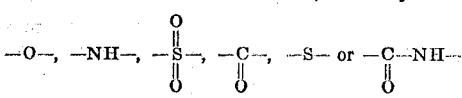

$R_2$ is a divalent organic group having 2 to 15 carbon atoms selected from the group consisting of —$(CH_2)_p$— where $p$ is a number from 2 to 10, cyclohexane,

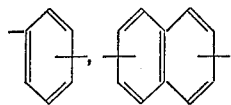

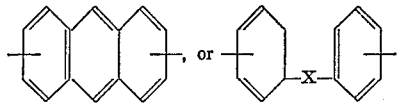

where X is a carbon-carbon bond, an alkylene group,

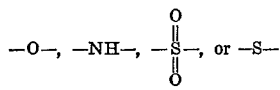

and $R_3$ is a divalent organic radical selected from the group consisting of 1.4-tetramethylene, 1.6-hexamethylene, 1.4-cyclohexane, 2.6-toluylene, 2.4-toluylene, 4.4-diphenylmethane, 4.4′-diphenylether, 1.5-naphthylene, 4.4′-hexhydrodiphenyl, 4.4′-triphenylmethane, 2.4-1-methoxybenzene, 4,4′-azobenzene, 4,4′-diphenylsulfone, 2,4-diphenylsulfide and 2,6-anthraquinone.

2. The polyimideamide of claim 1, wherein $R_2$ is a divalent aromatic group.

3. A method of producing polyamideimide excellent in heat resistance, characterized by reacting a polycarboxylic acid selected from the group consisting of

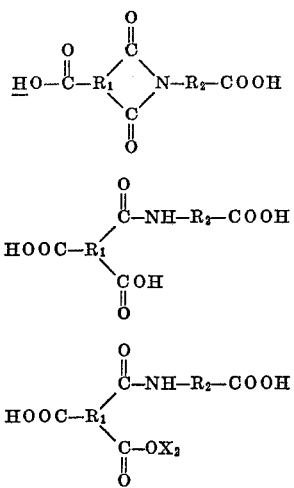

and

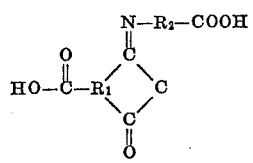

with at least one compound selected from the group consisting of diisocyanates of the formula $OCN-R_3-NCO$ produced by reacting said diisocyanate with an alcohol having 1 to 12 carbon atoms at a molar ratio in the range 1:1 or 1:2, wherein $R_1$, $R_2$ and $R_3$ are defined as in claim 1 and $X_2$ is an alkyl or aryl group at a reaction temperature in the range of 130° C. to 350° C.

4. The method according to claim 3, wherein up to 50 mole percent of said polycarboxylic acid is supplied in the form of carboxylic acid monoester of the formula

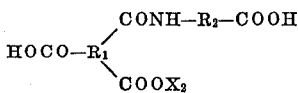

wherein $R_1$ and $R_2$ are as defined in claim 1 and $X_2$ is an alkyl or aryl group.

5. The method of producing polyamide imide according to claim 3 wherein said polycarboxylic acid (VII) has the following iminolactone ring.

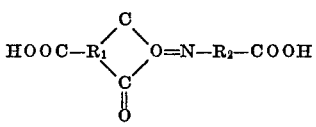

6. The method according to claim 3 wherein said polycarboxylic comprises amidetricarboxylic acid monoester (II′)

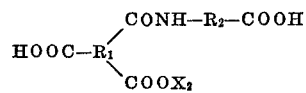

wherein $R_1$ and $R_2$ are the same as defined in claim 1, and $X_2$ is an alkyl, aryl or alicyclic group.

7. The method according to claim 3, wherein up to 95 mole percent of said polycarboxylic acid is replaced by at least one compound selected from the group consisting of

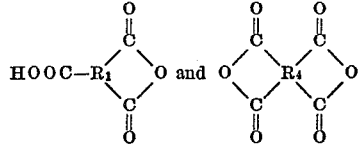

wherein $R_1$ is defined as in claim 1 and $R_4$ is a tetravalent organic group having 4 to 15 carbon atoms, 4 of which are bonded to separate carbonyl groups each of said 4 being adjacent to one other of said 4, $R_4$ being selected from the group consisting of benzene, biphenyl, a condensation cyclic compound having 2–3 benzene rings, and 5 and 6 member heterocyclic rings containing sulfur, nitrogen or oxygen hetero atoms.

References Cited

UNITED STATES PATENTS

| | | | |
|---|---|---|---|
| 3,179,635 | 4/1965 | Frost et al. | 260—78 |
| 3,238,181 | 3/1966 | Anderson | 260—65 |
| 3,314,923 | 4/1967 | Muller et al. | 260—78 |
| 3,428,486 | 2/1969 | George | 117—218 |
| 3,489,696 | 1/1970 | Miller | 260—2.5 |

WILLIAM H. SHORT, Primary Examiner

L. L. LEE, Assistant Examiner

U.S. Cl. X.R.

117—124 E, 128.4; 260—30.2, 30.6, 30.8 R, 32.2, 32.6 N, 63 N, 77.5 R, 78 TF